United States Patent [19]
Buckley et al.

[11] 4,295,887
[45] Oct. 20, 1981

[54] METHOD FOR THE CONTROL OF MICRO-ORGANISMS

[75] Inventors: Alan J. Buckley; Michael Singer, both of Manchester, England

[73] Assignee: Imperial Chemical Industries Limited, London, England

[21] Appl. No.: 51,853

[22] Filed: Jun. 25, 1979

Related U.S. Application Data

[63] Continuation of Ser. No. 922,361, Jul. 5, 1978, abandoned, which is a continuation of Ser. No. 841,908, Oct. 13, 1977, abandoned, which is a continuation of Ser. No. 667,439, Mar. 16, 1976, abandoned.

[30] Foreign Application Priority Data

Apr. 10, 1975 [GB] United Kingdom ............... 14795/75

[51] Int. Cl.³ .......................... C08K 5/16; C08K 5/36; C09D 5/14
[52] U.S. Cl. .............................. 106/18.33; 106/18.34; 260/45.75 R
[58] Field of Search .......................... 106/18.34, 18.33; 260/45.75

[56] References Cited

U.S. PATENT DOCUMENTS

3,629,457  12/1971  Grivas et al. ...................... 424/324

FOREIGN PATENT DOCUMENTS

48-39630  6/1973  Japan .

OTHER PUBLICATIONS

Chem. Abst. 54: 6623F.

*Primary Examiner*—Allan Lieberman
*Attorney, Agent, or Firm*—Cushman, Darby & Cushman

[57] ABSTRACT

A method for the protection of media which are susceptible to infection by micro-organisms against infection thereby, and for the suppression and control of such infection in media already infected, which comprises treating the medium with an effective amount of 2,2'-bis(methylaminocarbonyl)diphenyl disulphide. Particularly useful for the protection of paint films, for the in-can preservation of water-based paints and for the preservation of water-based adhesives and aqueous oil emulsions.

3 Claims, No Drawings

METHOD FOR THE CONTROL OF MICRO-ORGANISMS

This is a continuation, of application Ser. No. 922,361 filed July 5, 1978, which is a cont. of Ser. No. 841,908 filed Oct. 13, 1977, which is a cont. of Ser. No. 667,439 filed Mar. 16, 1976 all now abandoned.

This invention relates to the protection of media against infection by micro-organisms and more particularly to the use of certain amides for this purpose.

According to the present invention there is provided a method for the protection of media which are susceptible to infection by micro-organisms against infection thereby, and for the suppression and control of such infection in media already infected, which comprises treating the medium with an effective amount of 2,2'-bis(methylaminocarbonyl)diphenyl disulphide.

2,2'-Bis(methylaminocarbonyl)diphenyldisulphide may be prepared by adding diphenyldisulphide-2,2'-carboxylic acid chloride to an excess of aqueous methyl amine. An aqueous suspension of the product is obtained from which the solid compound can readily be isolated, for example, by filtration.

The method of the present invention is applicable to a wide variety of different media which are susceptible to attack by micro-organisms. Thus, 2,2'-bis(methylaminocarbonyl)diphenyldisulphide may be used as a slimicide in the water-systems of paper mills, in the preservation of leather and adhesives against attack by bacteria and fungi, for the in-can preservation of water-based paints and as a paint film fungicide, for the protection of aqueous oil emulsions, such as the cutting oils used as lubricants and coolants in the machining of metal, against bacterial infection and in aqueous media generally to prevent or remove infection by bacteria, fungi and algae, for wood preservation and for the short-term preservation of skins and hides prior to curing.

The amount of biocidal compound which is used will depend upon the nature of the medium which is being treated and also the organism or organisms against which the method is being applied. In general, the amount will be from 1 to 10000 parts per million by weight on the weight of the medium, and is preferably from 25 to 5000 parts per million by weight.

2,2'-Bis(methylaminocarbonyl)diphenyldisulphide is particularly useful as a paint film fungicide, for the preservation of water-based adhesives, such as wallpaper adhesives, against fungal attack, for preventing and combatting bacterial infection of aqueous oil emulsions and for the in-can preservation of water-based paints against bacterial infection. These specific uses are especially important features of the invention. For use as a paint film fungicide, the compound is added to the paint, before its application to a surface, to give a concentration in the paint in the range 500 to 10000 ppm by weight. For the remaining applications a concentration of the compound in the range 25 to 500 ppm by weight in the adhesive, oil emulsion or paint in the can is usually effective.

The biocidal compound may be added to the appropriate medium as the undiluted solid compound, as a solution in an organic solvent, for example, a lower alcohol such as methanol or ethanol, dimethyl formamide or an amine or mixture of amines, if desired together with water, or as dispersion in water prepared with the aid of a dispersing agent, for example, the sodium salt of a naphthalene sulphonic acid/formaldehyde condensate.

The invention is illustrated but not limited by the following Examples in which parts and percentages are by weight unless otherwise stated.

EXAMPLE 1

Comparison of the biocidal activity of 2,2'-bis(methylaminocarbonyl)-diphenyldisulphide (MACDD) with 1,2-benzisothiazolin-3-one (BIT) in an aqueous oil emulsion A mixture of diethanolamine (12 parts), triethanolamine (14 parts) and morpholine (7 parts) was made up to 66 parts with water. A 0.5% w/w solution of MACDD was prepared in this aqueous mixed amine solvent. Heating was necessary to assist solution of the compound.

BIT (0.5 part) was dissolved in a mixture of diethanolamine (12 parts), triethanolamine (14 parts) and morpholine (7 parts) and the solution was made up to 100 parts with water.

These stock solutions were added to 200 ml aliquots of a 1:20 oil-in-water emulsion prepared from Prosol 44 (Mobil) metal rolling oil to provide concentrations of 50, 75 and 100 ppm. The fresh oil emulsion was inoculated with 1 ml of contaminated emulsion and the surviving bacteria were determined at various periods up to 27 days. On day 10 the variants were re-inoculated with 0.5% v/v contaminated emulsion from the control variant.

Results were as follows:

| VARIANT | | SURVIVING BACTERIA (CELLS/ML) AFTER | | | | | |
|---|---|---|---|---|---|---|---|
| | | 0 | 1 day | 3 days | 7 days* | 18 days | 27 days |
| Control | | $1.38 \times 10^4$ | $2.61 \times 10^4$ | $5.7 \times 10^5$ | $2.43 \times 10^7$ | $>10^7$ | $>10^7$ |
| BIT, | 50 ppm | — | $1.2 \times 10^2$ | $<10$ | $1.5 \times 10^2$ | $<10$ | $<10$ |
| | 75 ppm | — | $4 \times 10^1$ | $<10$ | 30 | $<10$ | $<10$ |
| | 100 ppm | — | $<10$ | $<10$ | $<10$ | $<10$ | $<10$ |
| MACDD, | 50 ppm | — | $<10$ | $<10$ | $<10$ | $<10$ | $<10$ |
| | 75 ppm | — | $<10$ | $<10$ | $<10$ | $<10$ | $<10$ |
| | 100 ppm | — | $<10$ | $<10$ | $<10$ | $<10$ | $<10$ |

*10 days, re-inoculation.

These results indicate that MACDD is at least as active as BIT under these conditions and that MACDD reduced the bacterial count more rapidly than BIT (of 1 day counts).

A comparison of BIT with 2,2'-bis(aminocarbonyl) diphenyldisulphide for biocidal activity in an identical oil-in-water emulsion showed the latter compound to be totally ineffective under these conditions.

EXAMPLE 2

The comparison described in Example 1 was repeated using the same BIT solution but employing the MACDD as a 10% w/w aqueous dispersion prepared with the aid of the sodium salt of a naphthalene sulphonic acid/formaldehyde condensate (20% by weight on the weight of biocide) as dispersing agent.

The two compounds were added to fresh oil emulsion to provide a concentration of 100 ppm active ingredient, and the number of surviving bacteria were determined after inoculation periods of 1 and 3 days.

Results were as follows:

| Variant | Surviving bacteria (cells/ml) after: | |
|---|---|---|
| | 1 day | 3 days |
| Control | $1 \times 10^6$ | $6.8 \times 10^6$ |
| BIT, 100 ppm | $1.8 \times 10^2$ | <10 |
| MACDD, 100 ppm | <10 | <10 |

These results confirm the quicker kill of bacteria exhibited by MACDD compared with BIT which was described in Example 1.

EXAMPLE 3

Comparison of the biocidal activity of 2,2'-bis(methylaminocarbonyl)-diphenyldisulphide (MACDD) with 1,2-benzisothiazolin-3-one (BIT) as in-can preservatives for emulsion paint BIT (in the form of the solution in aqueous mixed amine solvent employed in Example 1) and MACDD (as the 10% aqueous dispersion employed in Example 2) were compared for their effectiveness as preservatives in a high PVC emulsion paint (styrene-acrylic).

The test biocides were added to 100 g quantities of paint which had become naturally infected with bacteria, to provide concentrations of the active ingredient of 25, 50, 75 and 100 ppm in each case. The numbers of surviving bacteria were determined after 1, 2 and 3 days.

Results were as follows:-

| VARIANT | | SURVIVING BACTERIA (CELLS/ML) AFTER | | |
|---|---|---|---|---|
| | | 1 day | 2 days | 3 days |
| Control | | $4.2 \times 10^6$ | $5.6 \times 10^6$ | $6.2 \times 10^6$ |
| BIT, | 25 ppm | $2.8 \times 10^6$ | $7.6 \times 10^5$ | $7.4 \times 10^4$ |
| | 50 ppm | $3.4 \times 10^6$ | $9.4 \times 10^5$ | $2 \times 10^5$ |
| | 75 ppm | $2.7 \times 10^6$ | $1.37 \times 10^5$ | $1.8 \times 10^5$ |
| | 100 ppm | $3.6 \times 10^6$ | $1 \times 10^6$ | $4.3 \times 10^4$ |
| MACDD, | 25 ppm | $8.4 \times 10^5$ | <10 | <10 |
| | 50 ppm | $1.31 \times 10^6$ | <10 | <10 |
| | 75 ppm | $1.62 \times 10^6$ | <10 | <10 |
| | 100 ppm | $1.02 \times 10^6$ | <10 | <10 |

These results indicate that MACDD is more active than BIT under these conditions.

EXAMPLE 4

Comparison of 2,2'-bis(methylaminocarbonyl)diphenyldisulphide (MACDD) and 1,2-benzisothiazolin-3-one (BIT) as fungistats for wallpaper adhesives Plaster was poured into trays ($9\frac{1}{2}'' \times 4\frac{1}{2}'' \times 1''$) and allowed to set. Ballotini glass beads were sprinkled in an approximately 1" band down the length of the plaster about 1" away from the edge of the tray.

100 ml of adhesive were inoculated with 2 ml of mould spore suspension (*Aspergillus niger* and *Chaetonium globosum*). For the untreated control and the test chemicals a modified vinyl adhesive containing Solvite G3 was used. A mould-resistant standard consisting of "Dulite" Vinyl adhesive containing 0.12% of sodium pentachlorophenate in 100 ml of wet adhesive was also used.

The inoculated and treated adhesives were each spread over four pieces of "Vymura" PVC-coated paper-backed wallpaper ($3\frac{1}{2}'' \times 1\frac{1}{4}''$) and the latter were struck firmly on to the moist plaster plaques. The material was incubated at 25° C. and the wallpaper was examined for fungal growth.

Results were as follows:

| Treatment | Staining of PVC | Staining of paper backing | Mold growth contact with plaster | Mold growth in vicinity of ballotini beads |
|---|---|---|---|---|
| Solvite G3 (control) | 0000 | 3343 | 3443 | 4443 |
| Dulite Vinyl | 0000 | 0000 | 0000 | 0000 |
| BIT (0.015 g/100ml) | 0000 | 3333 | 3443 | 4343 |
| MACDD (0.015 g/100ml) | 0000 | 0000 | 0000 | 0000 |

Fungal growth was graded from 0 to 4:
0 = total absence of fungal growth
1 = up to 25% of area covered with fungal growth or stained
2 = 25–50% of area covered with fungal growth or stained
3 = 50–75% of area covered with fungal growth or stained
4 = 75–100% of area covered with fungal growth or stained It is evident from the above results that MACDD is more active than BIT under these conditions and showed similar activity to sodium pentachlorophenate, although the latter was tested at the much higher level of 0.12%.

EXAMPLE 5

Comparison of 2,2'-bis(methylaminocarbonyl)diphenyldisulphide (MACDD) with sodium pentachlorophenate as fungistats for wallpaper adhesives The tests were carried out as described in Example 4, the MACDD being compared at three different concentrations with sodium pentachlorophenate in "Dulite" Vinyl adhesive.

Results were as follows:

| VARIANT | | Staining of PVC | Staining of paper backing | Mould growth in contact with plaster | Mould growth in vicinity of ballotini beads |
|---|---|---|---|---|---|
| MACDD, | 150 ppm | 0000 | 0000 | 0000 | 0000 |
| | 100 ppm | 0000 | 0001 | 0000 | 1000 |
| | 50 ppm | 0000 | 0001 | 0111 | 3113 |
| Sodium pentachlorophenate | | | | | |
| 1200 ppm | | 0000 | 20000 | 20111 | 00111 |
| Control | | 00000 | 34333 | 33332 | 34333 |

From these results it is apparent that MACDD at 100 ppm is at least as active as sodium pentachlorophenate at 1200 ppm, the concentration at which it is used commercially as a fungistat in wallpaper adhesives.

EXAMPLE 6

Comparison of 2,2'-bis(methylaminocarbonyl)diphenyldisulphide (MACDD) with the corresponding butyl analogue for bactericidal activity in aqueous oil emulsion.

MACDD and 2,2'-bis(butylaminocarbonyl)diphenyldisulphide (BACDD) were each made up as 1% w/w aqueous dispersions prepared with the aid of the sodium salt of a naphthalene sulphonic acid/formaldehyde condensate (20% by weight on the weight of biocide) as dispersing agent.

Each dispersion was added to 100 ml volumes of oil emulsion (Prosol 44 emulsifiable oil, 5% in water) in 250 ml conical flasks to provide active ingredient concentrations of 50, 100 and 200 ppm, i.e. six experiments in all. Each variant was then inoculated with 1 ml of a highly contaminated emulsion (containing a high count of a mixed population of bacteria) and shaken on a rotary shaker at 25° C. Surviving bacteria were determined after 1 and 3 days.

| Treatment | | Survivors (cells/ml) after | |
|---|---|---|---|
| | | 1 day | 3 days |
| MACDD, | 200 ppm | $3.5 \times 10^2$ | $4.2 \times 10^2$ |
| | 100 ppm | $5.6 \times 10^3$ | $4.0 \times 10^4$ |
| | 50 ppm | $6.3 \times 10^4$ | $7.0 \times 10^5$ |
| BACDD, | 200 ppm | $5.6 \times 10^6$ | $5.8 \times 10^7$ |
| | 100 ppm | $9.0 \times 10^6$ | $6.1 \times 10^7$ |
| | 50 ppm | $1.2 \times 10^7$ | $1.2 \times 10^8$ |
| Control | (no biocide) | $1.1 \times 10^7$ | $1.5 \times 10^8$ |

These results show that MACDD markedly reduces the bacterial count whereas the butyl analogue BACDD has no antibacterial activity in oil emulsion.

EXAMPLE 7

Comparison of the Antibacterial and Antifungal Activity of 2,2'-bis(methylaminocarbonyl)diphenyldisulphide (MACDD) with the corresponding butyl analogue (BACDD)

The two compounds MACDD and BACDD were made up as 1% w/w aqueous dispersions as described in Example 6, and were added to malt agar and nutrient agar media to provide concentrations of 25, 50 and 100 ppm. The biocide-containing nutrient agar media were then surface-streaked with the bacteria *Staphylococcus aureus*, *Escherichia coli* and *Pseudomonas aeruginosa* and the malt agar media were inoculated (central stab inoculum) with the fungi *Aspergillus niger*, *Pullularia pullulans*, *Alternaria tenuis*, *Trichoderma viride* and *Chaetomium globosum*.

The nutrient agar plates were incubated at 37° C. for 1 day and the malt agar plates were incubated at 25° C. for 5 days, after which the plates were examined for the presence or absence of bacterial or fungal growth.

Results were as follows:

| Variant | | | | | Growth of | | | | |
|---|---|---|---|---|---|---|---|---|---|
| | | S. aureus | E. coli | Ps. aeruginosa | Asp. niger | P. pullulans | Alt. tenuis | Tr. viride | Ch. globosum |
| MACDD | 100 ppm | − | − | + | 34 | 12 | 7 | 83 | 0 |
| | 50 ppm | − | − | + | 40 | 23 | 24 | 83 | 0 |
| | 25 ppm | − | − | + | 35 | 28 | 27 | 83 | 0 |
| BACDD | 100 ppm | − | − | + | 40 | 23 | 25 | 83 | 0 |
| | 50 ppm | + | + | + | 63 | 28 | 33 | 83 | 0 |
| | 25 ppm | + | + | + | 60 | 31 | 46 | 83 | 0 |
| Control (no biocide) | | + | + | + | 60 | 42 | 40 | 83 | 60 |

In the above table, for bacteria
+ = no inhibition of growth
− = total inhibition of growth
for fungi, the numbers refer to the diameters of the fungal colonies in mm.

It can be seen that with regard to antibacterial activity within the range of concentrations tested neither compound inhibited *Ps. aeruginosa*, although MACDD was markedly more active than BACDD against the remaining bacteria.

In the case of fungi, both chemicals totally inhibited the growth of *Ch. globosum*, neither inhibited *Tr. viride*, but MACDD had higher activity than BACDD against the remaining fungi.

EXAMPLE 8

Comparison of 2,2'-bis(methylaminocarbonyl)diphenyldisulphide (MACDD) with 1,2-benzisothiazolin-3-one (BIT) as paint film fungicides Canadian yellow cedar panels (12"×6"×1") were treated with one coat of pink lead primer and two coats of "Dulux" undercoat ("Dulux" is a Registered Trade Mark), each undercoat layer being lightly sanded before application of the subsequent coats of paint. Two final coats of emulsion paint containing the test fungicides were then applied to the panels without sanding.

The test compounds MACDD and BIT were incorporated into a poly(vinyl acetate) copolymer emulsion paint by ball-milling during the formulation of the paint to provide concentrations of 3000 and 6000 ppm in the wet paint.

The panels were set by air to Malaysia and exposed vertically in a jungle site, where they were examined at intervals for fungal growth. Exposure commenced on Aug. 30th, 1974.

Results were as follows:-

| | % Area of Panel covered with fungal growth on: | | | | | | | | | | | | | | |
|---|---|---|---|---|---|---|---|---|---|---|---|---|---|---|---|
| | 1974 | | | | | | | | | 1975 | | | | | |
| Variant | 3.10 | 24.10 | 7.11 | 14.11 | 21.11 | 28.11 | 5.12 | 12.12 | 19.12 | 26.12 | 2.1 | 9.1 | 16.1 | 23.1 | 30.1 | 6.2 |
| Control (no biocide) | 90 | 100 | 100 | 100 | Panels Withdrawn | | | | | | | | | | | |
| MACDD, 3000 ppm | 0 | 1 | 1 | 5 | 10 | 20 | 20 | 20 | 25 | 30 | 40 | 45 | 55 | 65 | 75 | 80 |

-continued

| Variant | % Area of Panel covered with fungal growth on: | | | | | | | | | | | | | | | |
|---|---|---|---|---|---|---|---|---|---|---|---|---|---|---|---|---|
| | 1974 | | | | | | | | | | 1975 | | | | | |
| | 3.10 | 24.10 | 7.11 | 14.11 | 21.11 | 28.11 | 5.12 | 12.12 | 19.12 | 26.12 | 2.1 | 9.1 | 16.1 | 23.1 | 30.1 | 6.2 |
| MACDD, 6000 ppm | Nil | Nil | Nil | Nil | 5 | 5 | 5 | 5 | 10 | 10 | 15 | 25 | 30 | 40 | 40 | 45 |
| BIT, 3000 ppm | 1 | 25 | 30 | 50 | 50 | 70 | 75 | 80 | 80 | 85 | 90 | 90 | 90 | 90 | 95 | 95 |

The first row of pairs of numbers (i.e. 3.10 to 6.2) under "1974" and "1975" indicate the day and month respectively of those years on which examination of the panels was carried out.

These results show that MACDD has high activity as a paint film fungicide and is markedly more active than BIT.

We claim:

1. A water-based paint or adhesive which is susceptible to infection with Pullularia pullulans when applied to a substrate, and which has been protected against infection by Pullularia pullulans and other microorganisms by adding to the paint or adhesive an effective amount, in the range 1 to 10,000 parts per million based on the weight of the paint or adhesive, of 2,2'bis-(methylaminocarbonyl)diphenyldisulfide, said paint or adhesive being in a container.

2. A water-based paint which is susceptible to infection with Pullularia pullulans when applied to a substrate, and which has been protected against infection by Pullularia pullulans and other microorganisms by adding to the paint an effective amount, in the range 25 to 500 parts per million based on the weight of the paint, of 2,2'-bis-(methylaminocarbonyl)-diphenyldisulfide, said paint being in a container.

3. A water-based adhesive which is susceptible to infection with Pullularia pullulans when applied to a substrate, and which has been protected against infection by Pullularia pullulans and other microorganisms by adding to the adhesive an effective amount, in the range 25 to 500 parts per million based on the weight of the adhesive, of 2,2'-bis-(methylaminocarbonyl)-diphenyldisulfide, said adhesive being in a container.

* * * * *